United States Patent
Kofman et al.

(10) Patent No.: US 7,837,286 B2
(45) Date of Patent: Nov. 23, 2010

(54) GUIDE UNIT FOR POSITIONING TRAYS IN EDIBLE INK PRINTER

(76) Inventors: Leonid M. Kofman, 35 Seacoast Ter., Apt. 15L, Brooklyn, NY (US) 11235; Yuri D. Chernov, 2448 E. 22$^{nd}$ St., Brooklyn, NY (US) 11235; Gennady I. Kleyman, 1209 E. 19$^{th}$ St., Suite 3A, Brooklyn, NY (US) 11230

(*) Notice: Subject to any disclaimer, the term of this patent is extended or adjusted under 35 U.S.C. 154(b) by 1232 days.

(21) Appl. No.: 10/540,957

(22) PCT Filed: Aug. 20, 2002

(86) PCT No.: PCT/US02/26384
§ 371 (c)(1),
(2), (4) Date: Jun. 29, 2005

(87) PCT Pub. No.: WO2004/018217
PCT Pub. Date: Mar. 4, 2004

(65) Prior Publication Data
US 2006/0119628 A1    Jun. 8, 2006

(51) Int. Cl.
*B41J 25/308* (2006.01)
(52) U.S. Cl. .............................. 347/8; 347/4
(58) Field of Classification Search .............. None
See application file for complete search history.

(56) References Cited

U.S. PATENT DOCUMENTS

| 4,531,292 | A | 7/1985 | Pasternak |
| 4,979,720 | A | 12/1990 | Robinson |
| 5,407,691 | A | 4/1995 | Przelomski et al. |
| 5,895,682 | A | 4/1999 | Tsukioka |
| 5,898,591 | A | 4/1999 | Hettinga et al. |
| 5,992,742 | A | 11/1999 | Sullivan et al. |
| 6,230,073 | B1 * | 5/2001 | Kofman et al. ............... 700/204 |
| 6,408,595 | B1 * | 6/2002 | Friedman ..................... 53/329 |

FOREIGN PATENT DOCUMENTS

WO    WO 01/29748 A1    4/2001

OTHER PUBLICATIONS

International Search Report.

* cited by examiner

*Primary Examiner*—Matthew Luu
*Assistant Examiner*—Justin Seo
(74) *Attorney, Agent, or Firm*—The Farrel Law Firm, LLP

(57) ABSTRACT

An apparatus for printing a visual image on food items (20) has a printing station provided with a printer (12) connected to the computer and having software for directly printing the image on the exposed surface of the food item. The printing station includes a frame, at least one tray receiving the food item and displaceably supported on the frame, a printer head and a guide mechanism operative to linearly displace the tray so that a distance between the printer head and the exposed surface of the food item remains uniform as the tray is displaced along the travel direction.

16 Claims, 7 Drawing Sheets

GUIDE UNIT FOR POSITIONING TRAYS IN EDIBLE INK PRINTER

FIELD OF THE INVENTION

The invention relates to an apparatus for reproducing an image onto absorbent and non-absorbent surfaces of foodstuffs, such as chocolates, cheese, cakes, cookies or the like. Particularly, the invention relates to a printing assembly provided with a guide mechanism for delivering trays loaded with food items to the printing station of the inventive apparatus.

BACKGROUND OF THE INVENTION

The application of decorative means to various foodstuffs, such as the surface of a cake, essentially derived over the years as an individual craft of the artisans skilled efforts in providing personalized decorations to such components. For example, early ornamentations provided to cakes, cookies and related types of foodstuffs, fairly well depend upon the skill, dexterity, and imagination of the baker, in order to get any facsimile of decoration upon the finished food product.

Decorating surfaces of food products have gained tremendous popularity throughout the world. Numerous automatic systems for reproducing a variety of images are currently available at the market.

U.S. Pat. No. 6,230,073 assigned commonly with this application and fully incorporated herein by reference discloses a jet printing device producing images directly on a food item. While the device provides high definition imaging transfer onto the surface of food item, its delivering assembly for guiding foodstuff trays toward a printing station is complex and cumbersome.

It is, therefore, desirable to provide an apparatus that provides a simple structure of a guiding mechanism for delivering foodstuff trays towards a printer station. Furthermore, a simple and reliable alignment system providing automatic alignment of the foodstuff trays delivered at the printer station is also desirable.

SUMMARY OF THE INVENTION

An automatic system including a printing assembly constructed in accordance with the invention attains the desired objectives.

In accordance with one aspect of the invention, a guide mechanism for delivering foodstuff trays to a printing station includes an assembly for converting rotational motion of a motor shaft into linear motion of trays with foodstuff. The assembly includes a rack and pinion mechanism mounted on the motor shaft and enabling a plurality of trays to move linearly in the same plane towards the printing station. The rack and pinion mechanism simultaneously supports opposite sides of the trays extending parallel to a direction of travel of the trays. As a result of the linear displacement of the trays a printing head is automatically positioned at a predetermined distance above food items carried by the trays.

In accordance with another aspect of the invention, a guide mechanism for delivering trays toward the printing station also includes an assembly for converting rotational motion of a motor shaft into linear motion of trays. However, instead of supporting opposite sides of the trays, a rack and pinion mechanism is mounted midway between the opposite sides and under the bottom of the trays. One of the advantages of this embodiment includes a simplified structure that has a single rack and pinion unit instead of two such units necessary to the operation of the first embodiment.

Still another embodiment of a guide mechanism in accordance with the invention includes a ball screw mechanism transmitting rotary motion of the motor shaft into linear motion of the trays.

BRIEF DESCRIPTION OF THE DRAWINGS

The above and other objects, features and advantages will become more readily apparent from the following specific description presented in conjunction with the following drawings, in which.

SPECIFIC DESCRIPTION

Figure 1:
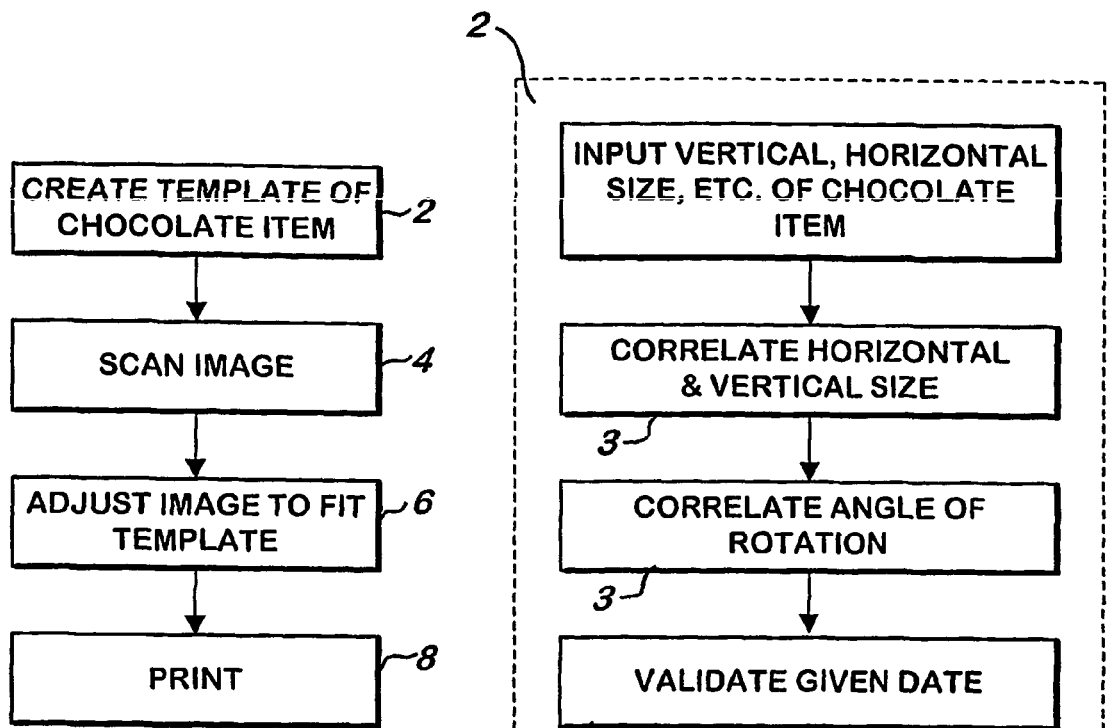
FIG. 1 is a flow chart of a process in accordance with the invention.
Figure 2:
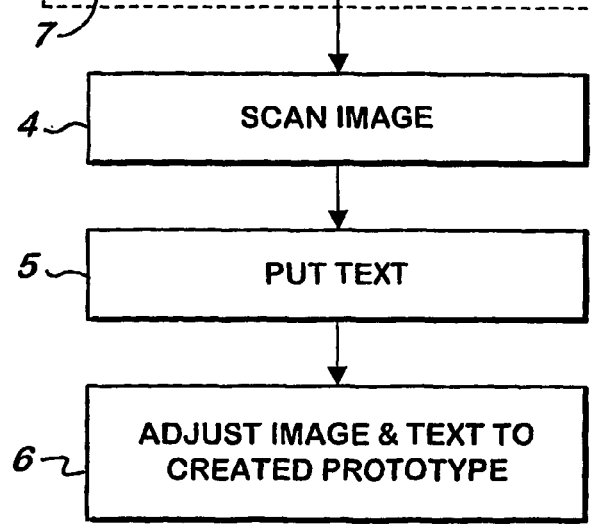
FIG. 2 is a more detailed flow chart of a step of creating a prototype of the food item according to a process of FIG. 1.

Referring to FIG. 1, the invention operates in accordance with a flow chart and achieves the above-stated objects by printing a pictorial image, a verbal statement or a combination thereof directly on a surface of a food item, which may be absorbent or non-absrbent. Particularly, an operator using software creates a prototype of a food item shown at 2. An algorithm, shown in FIG. 2 and allowing the operator to correlate horizontal and vertical size of the prototype at 3 as well as an angle of rotation at 5, can do this. Upon completion of the prototype, all necessary data is both validated and stored in database 7.

Having created a template of the food item, the operator scans an image 4 to be printed on the item's surface, and further adjusts a size thereof at 6 so it can fit the previously created prototype. Alternatively, the prototype of the food item may still be modified to fully fit the desirable image. In addition to adjusting the image, the operator may further add a text 5, a position of which can also be adjusted as shown at 6.

Once the operator is satisfied with the created design, a signal sent to a printer enables it to print the image with edible ink on a real food item that has been manufactured according to the created prototype.

Referring to FIGS. 3-9, a printing station includes a printer 12 and a guide mechanism 14 (FIG. 3) directing trays 16, 18 (FIGS. 8-9) toward the printing station 10 for producing images of food items 20 (FIG. 3), some of which can have sugar coated surfaces. Preferably, the food item 20 can be selected from, but is not limited to, cookies, breads, cakes, chocolate, ice cream and cheese and arranged in any predetermined pattern. Preferably, the food items 20 are placed in parallel rows.

Figure 3:
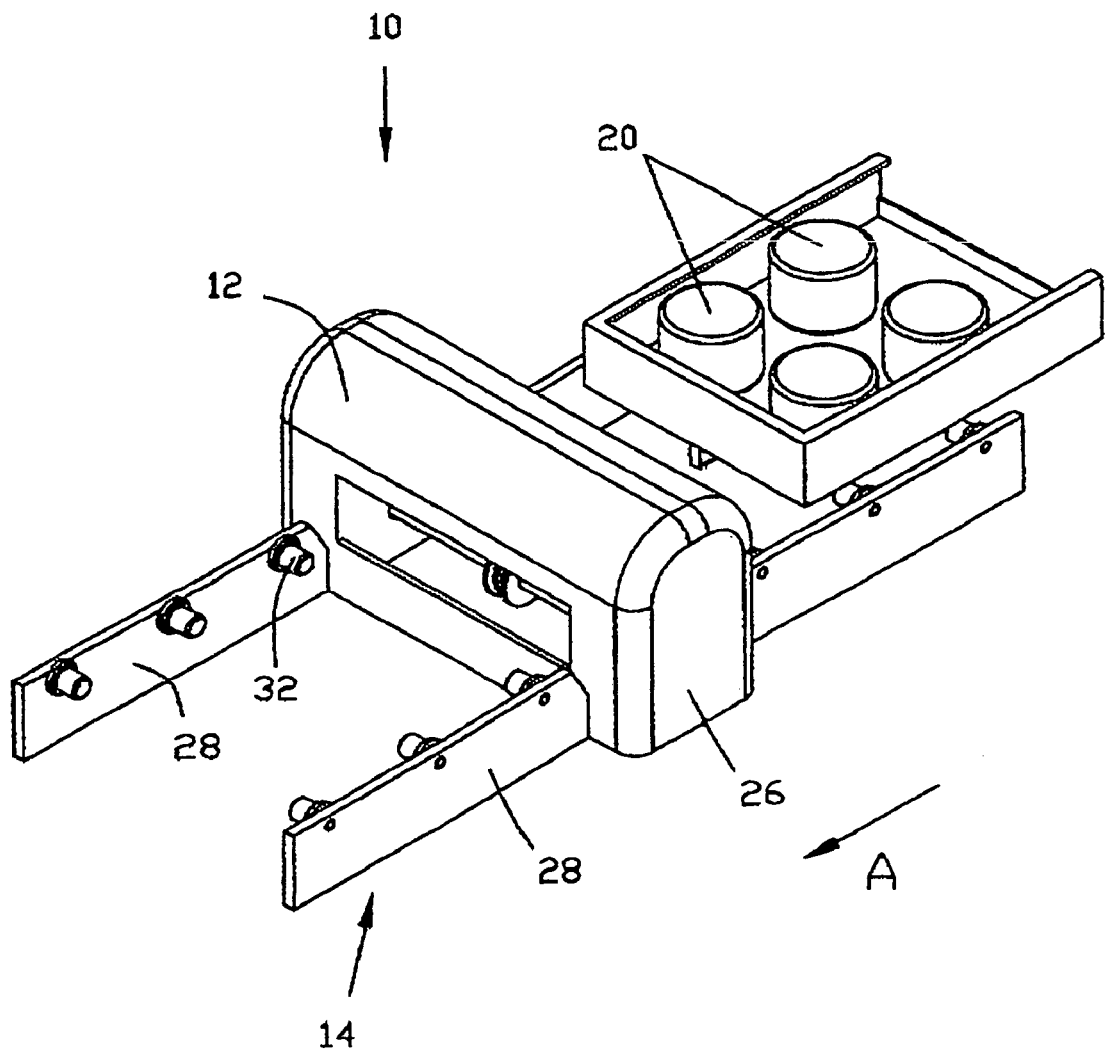
FIG. 3 is an isometric view of a printing station assembly constructed in accordance with the invention.
Figure 4:
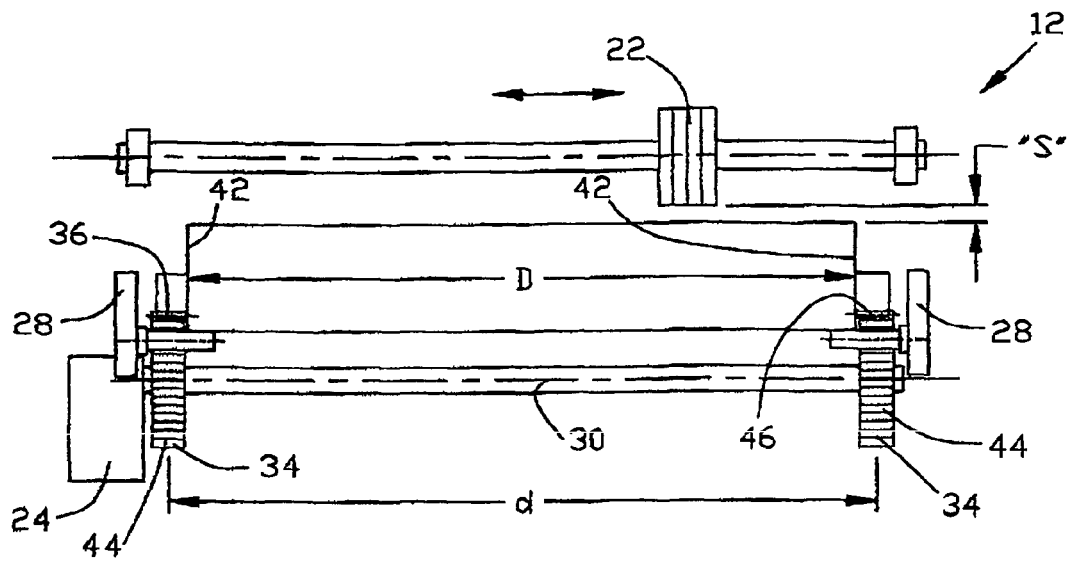
FIG. 4 is a front view of a guide mechanism for delivering foodstuff trays in according to one embodiment of the invention.
Figure 5:
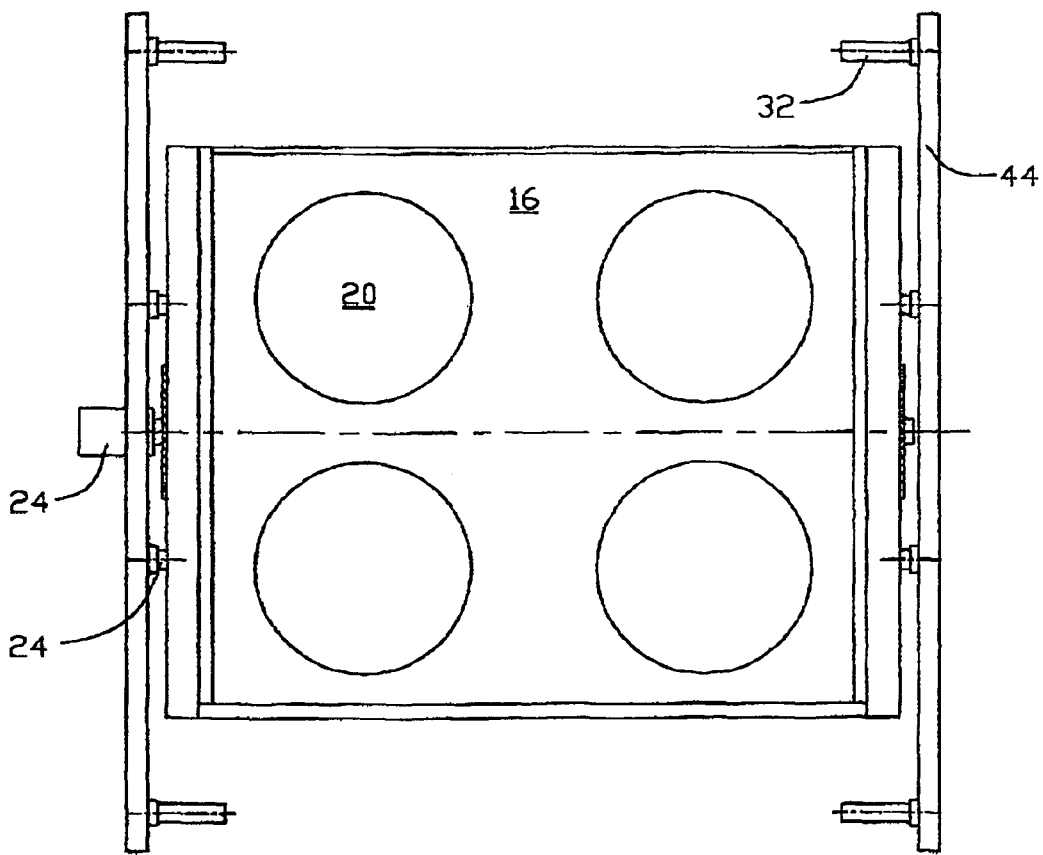
FIG. 5 is a top view of the guide mechanism shown in FIG. 4.

The printer 12, as shown in FIG. 4, is preferably selected from Encad CROMA-24 or Encad T-200 or similar ink printing devices. The printer is placed in a housing 26 and includes a print head 22 displaceable transversely to a travel direction A (FIG. 3) in a predetermined manner in accordance with stored software and delivering colored edible ink to the surface of the food items. One of the advantages of the inventive apparatus is that the printing head 22 is displaceable transversely to a travel direction (A) (FIG. 1) in the same plane regardless of a height of food products. To accommodate different dimensions of the food items 20, the printing trays 16,18 have a plurality of indentation—having a sufficient depth to receive a variably sized food products 20 such that a gap "S" (FIG. 4) between the head 22 and the top surface of the food product 20 remains uniform during the entire process of producing the image. The gap "S" is an optimal uniform gap providing high resolution images for products having different thicknesses.

To maintain the gap "S" uniform, it is necessary to displace the trays 16, 18 in a predetermined plane, which is accomplished by the guide mechanism 14 accommodating variably dimensioned food products so that the optimal gap "S" remains constant.

In regard to the guide mechanism 14, it includes a support surface, which can be formed by a pair of space rails 28 (FIG. 3) or by a continuous surface, and has a motor 24 mounted in the housing 26 and provided with a motor shaft 30. The guide mechanism further includes freely rotatable spaced rollers 32 (FIG. 4) mounted on the rails 28 along the travel directions to maintain coplanar displacement of the trays 16, 18.

Figure 9:
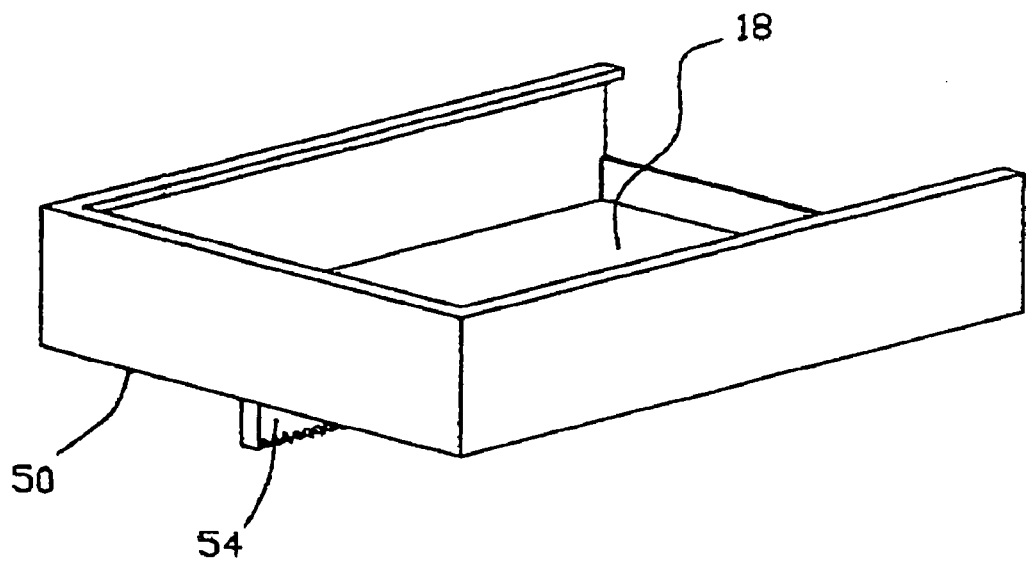
FIG. 9 is an isometric view of a foodstuff tray used in the guide mechanism illustrated in FIGS. 5 and 6.

In accordance with one aspect of the invention shown in FIGS. 3, 4 and 9, a motion translating assembly converting rotational motion of the motor 24 into linear motion of the tray 16 (FIG. 9) includes a pair of gears 34 mounted on the motor shaft 30 and rotatable therewith. The gears 34 are spaced apart at a distance slightly exceeding a distance between opposite sides 42 of the tray 16, 18 and engage two racks 36 mounted on the opposite sides 42 of the trays, as better seen in FIG. 9. The gears 34 and racks 36 have teeth 44 and 46, respectively which are selected to provide a desired reduction ratio. As a result of the structure shown in FIGS. 4, 5 and 8, the tray 16 is displaced along a series of rollers 32 in the same plane maintaining the optimal gap "S" along the travel direction "A".

Figure 6:
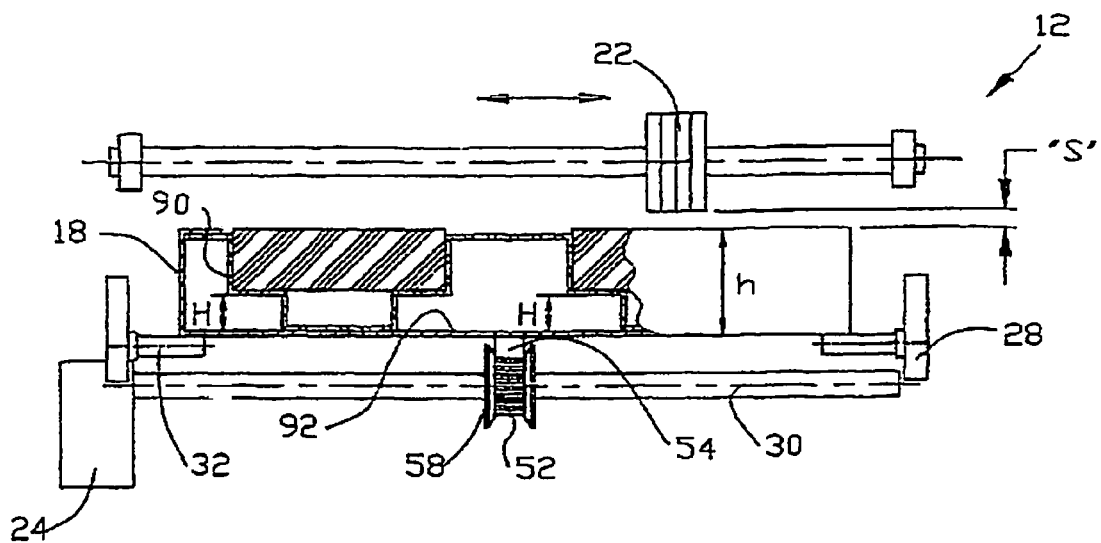
FIG. 6 is a side view of the guide mechanism in accordance with another embodiment of the invention.
Figure 7:
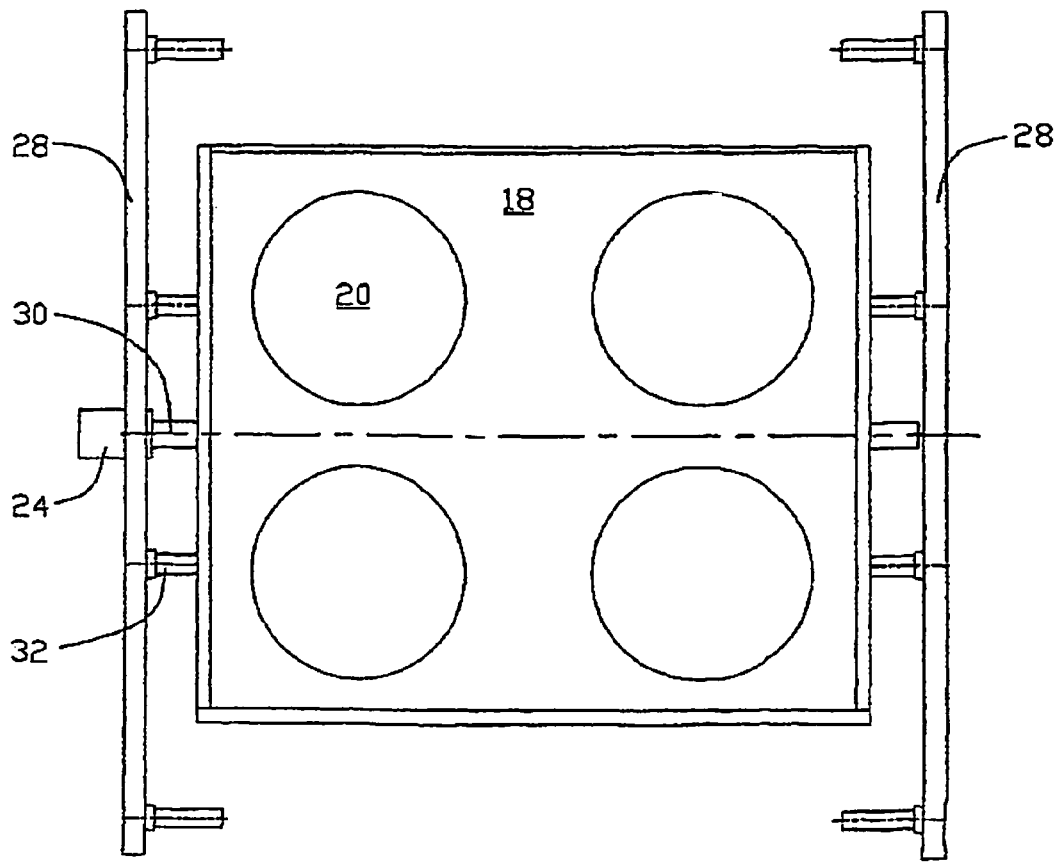
FIG. 7 is a top view of the guide mechanism shown in FIG. 6.
Figure 8:
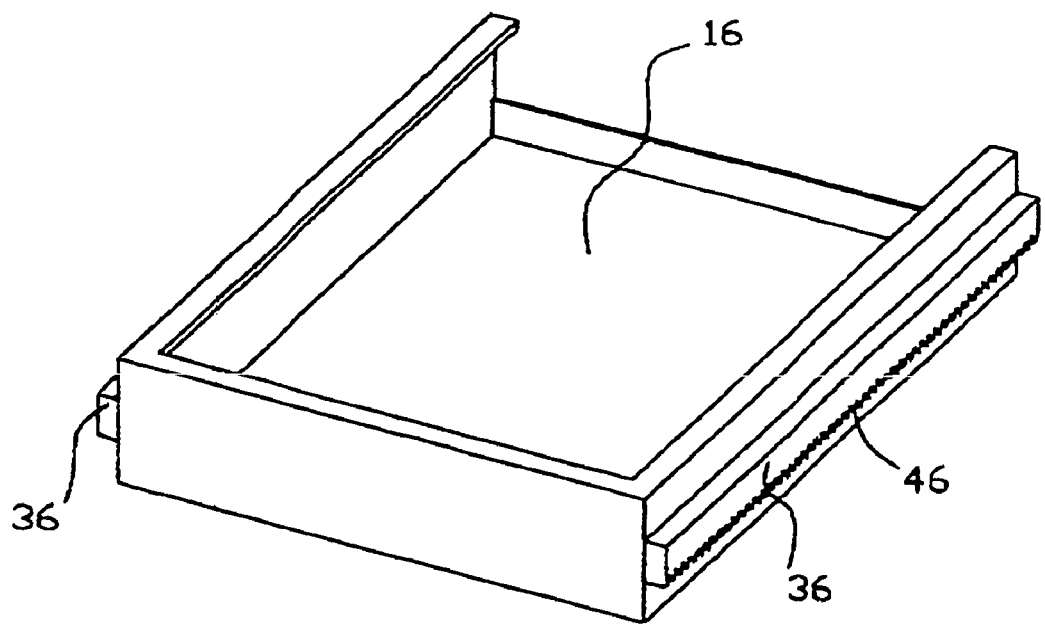
FIG. 8 is an isometric view of a foodstuff tray utilized in conjunction with the guide mechanism shown in FIGS. 3 and 4.

Alternatively, as shown in FIGS. 6, 7 and 9, the motor 24 can be mounted so that a guide mechanism 48 is spaced midway between the opposite sides 42 of the tray 18 and under its bottom 50. Similarly to the embodiment shown in FIGS. 4, 5 and 9, the guide mechanism 48 includes a rack and pinion unit, which consists of the gear 52 keyed to the motor shaft 30 and the rack 54 fixed to the bottom 50 of the tray 18, as better seen in FIG. 9.

To prevent lateral displacement between the gear 52 and the rack 54, a pair of flanges 58 extend from the bottom 50 of the tray 18 to flank an engaging assembly consisting of the gear 52 and the rack 53. Accordingly, the tray 18 moves along the support rolls 32 in the same horizontal plane providing the optimal gap "S" as long as the gear 52 meshes with the rack 54. Alternatively, the flange can be formed on the shaft 30 and flank the gear 52, as shown in FIG. 6. Note that any structure limiting lateral displacement of the gears and directing the trays along a linear path is conceived within the scope of this invention.

Various embodiments of the guide mechanism can be utilized within the scope of the invention. Alternatively to the inventive guide assembly illustrated in FIGS. 4-9, the guide mechanism can include a ball screw unit assembled of a nut rotationally fixed to the shaft and a screw shaft attached to the trays. The nut and the screw shaft are connected together by disposing a plurality of balls therebetween. A structure of the screw ball unit can be reversed by attaching the screw shaft to the motor shafts and fixing the nut to the tray. To provide attachment between the motor shaft and the nut, the motor shafts can be provided with a spline receiving a projection of the nut.

To maintain the optimal gap "S" for variously dimensioned food products, provided, of course, that the trays 16, 18 are displaceable linearly, each tray having a uniform set of dimensions receives a plurality of cassettes. The cassettes, in turn, are manufactured to have different thicknesses corresponding to respective food products which, when received in the cassette, have their respective surfaces and the printer head form the optimal gap "S". Particularly, referring to FIG. 6, the tray 18 has a bottom 92 supporting an arrangement of cassettes 90 which may or may not be coupled with one another. While a height "h" of the tray 18 remains constant and is equal to the overall height of the trays, a distance H at which the bottom of the cassettes is spaced from the support surface 92 of the tray varies in accordance with a thickness of a food product. However, the distance H is selected so that the top surface of the food product and the printer head 22 always define the optimal gap "S".

Figure 10:
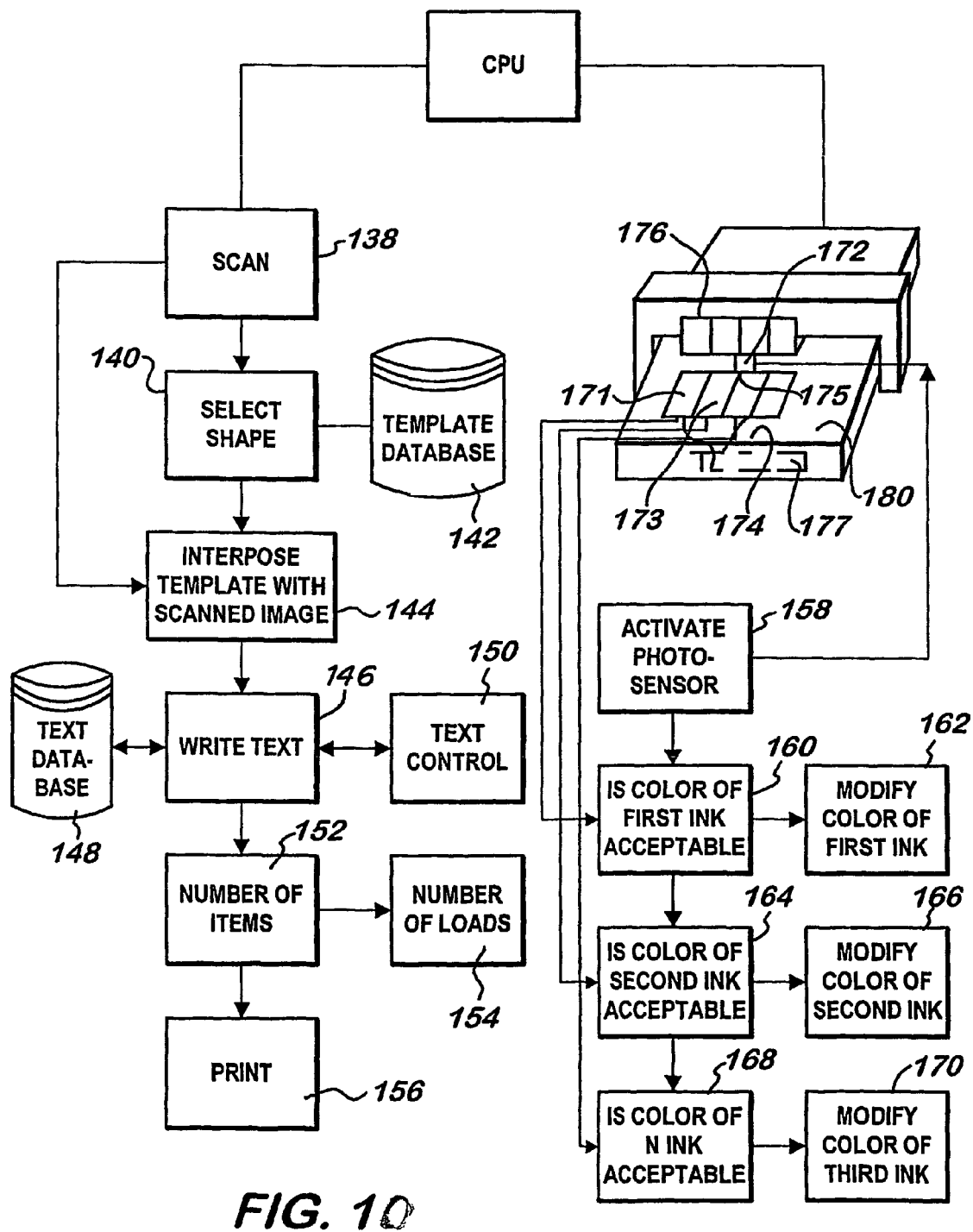
FIG. 10. is a flow chart illustrating the operation of a printing machine in accordance with the invention.

An apparatus in accordance with the invention can operate in different modes, as shown in FIG. 10. An automatic mode is characterized by a fully automatic system for adjusting colors. The present apparatus utilizes a-four-color combination of edible inks including magenta, cyan, yellow and black. Obviously, the black color can be obtained by mixing up the first three colors in equal proportions.

Software executing on a CPU and responsible for the automatic operation of the apparatus allows an image to be printed first to be first scanned at 138. The image can be delivered by any means including electronic media. After the image has been scanned, the operator by means of a scroll-down menu, which appears on a touch screen, selects one of the variety of templates stored in a template database 142. By utilizing an image control, an operator can zoom in, zoom out and displace the image within the selected template to obtain a desirable position of the image at 144.

After the image has been positioned on the template, an operator can write a text 146. The test can be a standard one and thus be selected from a text database 148, or optionally, the operator can create an individual message. Software allows those areas of the image which are suitable for receiving the selected or written text to be highlighted so as the operator is able to complete an item by placing the text on the image in accordance with his/her preferences at 150.

Having completed the composition of the image, the operator may introduce the number of images to be printed at 152. As disclosed above, the apparatus is provided with cassettes or transport trays receiving a limited number of templates. A transport surface 180 of the apparatus is sized to have only a limited number of transport trays and, thus, if the number of images exceeds the number of trays that can be simultaneously placed on the transport surface, the operator has to reload new trays after the first portion of images has been printed. The operator receives a written message as how many trays are needed to be filled in accordance with the introduced number of images and, in addition to a purely numerical information, an image with the filled trays is displayed on the screen. Thus, for example if a transport tray is sized to receive 10 heart-shaped images and the operator needs 37 images, four trays, one of which is not fully filled with the images, appear on the screen. Further, if the transport surface is sized to receive, for instance, 5 trays, whereas the introduced number of images require more than that, the screen will inform the operator how many trays should be loaded after the first five have been processed.

After all the preparations have been completed, software automatically provides a modified print calibration color profile to match the colors of edible ink with the scanned image. This color calibration changes the print driver to correctly print the colors by properly mixing the jetted inks on the chocolate.

A semiautomatic mode that has an initial image preparation stage identical to the automatic mode, allows an operator to calibrate the colors in accordance with either a stored data or the operator's taste and experience.

Thus, it is possible to introduce and store a series of desirable spectral characteristics of each of the known colors of edible inks as reference values, so as every time when either new inks are introduced in old cartridges or new cartridges filled with ink are used, an operator may have an option of verifying the quality of the inks. In practical terms, the operator before printing the created images, introduces a sample 174 under a cartridge 176 to have regions of the item's surface painted in magenta 171, cyan 173, yellow 175, and optionally in black. Further, a source of light 177 illuminates each of the differently painted regions and the thus generated light is sensed at 160, 164, and 168 by a photo-sensor 172 that generates a frequency signal representing spectral characteristics of the respective color. Software for controllably displacing the sensor over and above the painted sample can be easily installed in the CPU, so upon introduction of the painted sample the sensor provides a dynamic type of measurement. Alternatively, a photo-resistor serving as a switch can be used. In any case, upon comparison of the detects signal at 162, 166 and 170 with the reference value in a comparator or based on the operator's visual preferences in a manual mode of operation, each color may be modified during the printing process. Thus, for example, if magenta is too dark, then every segment of an image designed to be printed in this color may additionally receive an extra volume of yellow and become somewhat brighter.

The automatic mode of operation is preferable during the mass production, whereas the semi-automatic mode designed to increase the quality of the printed image is preferred for individually created images.

Figure 11:
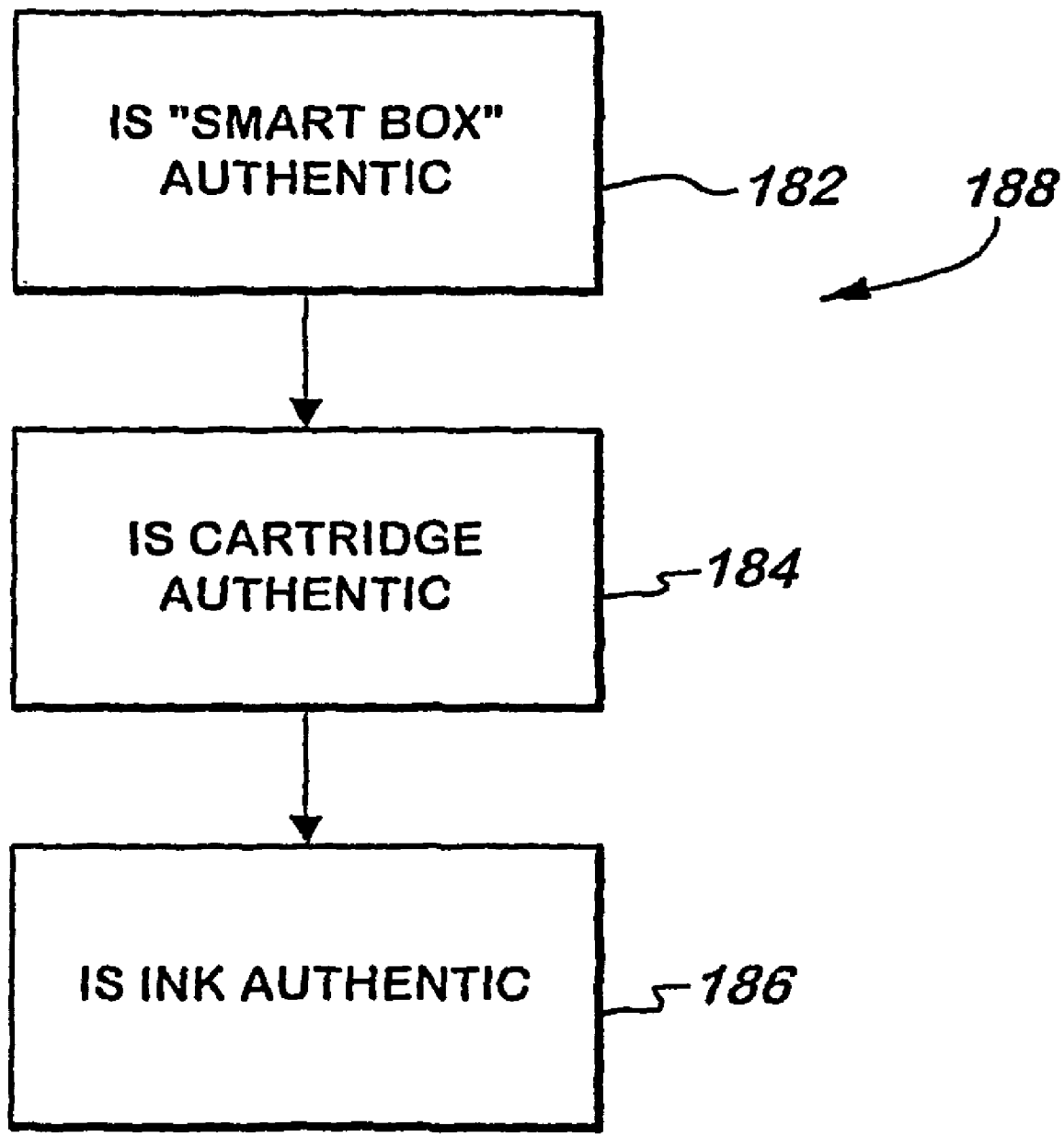
FIG. 11 is a flow chart illustrating a sequence of controlling critical parameters of the inventive printing machine.

Turning to FIG. 11, the apparatus is provided with a system 188 capable of identifying the authenticity the apparatus's components. It is imperative that only the authentic edible ink be used with the apparatus in order to avoid severe health problems that may be caused by non-authenticated inks. A special formula of the edible ink used for printing images on the chocolate obviously can be coded and consists of chemical and physical elements. Density, conductivity and other characteristics of the ink can be measured by generating ultrasound signal. A source of which may be installed on a cartridge, and upon comparison of a response signal with a reference value, the authenticity of the ink is determined. Further, it is possible to detect and verify whether a cartridge is correctly filled with the edible ink. Thus, if the volume of ink in a new cartridge deviates from the designed volume, then it is a good indication that the components have been tampered with. Different technologies can be used to properly authenticate the components of the apparatus including memory chips, smart carts, the ink, such as an RF technology, an ultra-sound technology, and the like. Each of the coded components including cartridges, "smart boxes" processors and components of a computer can have receptacles for receiving electrical connectors to communicate with storage devices, each of which stores a respective code uniquely identifying each of the elements.

Thus, for example, each cartridge can be supplied with a chip programmed to provide a certain verifying operation in response to a signal generated from the CPU. As shown in FIG. 11, if either a computer or smart box 182, which is equipped with software responsible for a step-by-step operation of the inventive printing method, a cartridge 184 or the inks 186 is detected not to be authentic, the apparatus is blocked from printing. Software also allows the operator to see which one of the main components is not standard by graphically pointing it out on a screen.

The embodiments of the invention which have been described are merely illustrative of a few of the applications of the principles of the invention. Various modifications may be made by an artisan without departing from the scope of the invention, as recited by the following claims.

What is claimed is:

1. An apparatus for printing an image onto a food item, the apparatus comprising:
   at least one cassette including a recess corresponding to variable dimensions of the food item in order to receive the food item therein;
   a directing tray for receiving the at least cassette;
   a guide mechanism for receiving the directing tray, guiding the directing tray in a first direction, and maintaining a planar height of the directing tray; and
   a printing device that is moveable only within a plane at a fixed height above the directing tray, for printing an image onto the food item,
   wherein a depth of the recess of the at least one cassette is determined based upon a thickness of the food item, such that a top surface of the food item is positioned a predetermined optimal distance from the printing device when the directing tray receiving the at least one cassette is positioned below the printing device.

2. The apparatus of claim 1, further comprising a computer for receiving an image and for controlling the printing device such that the received image is printed onto the food item.

3. The apparatus of claim 1, further comprising a motor including a motor shaft for providing a rotational movement to move the directing tray in the first direction.

4. The apparatus of claim 3, wherein the guide mechanism comprises a gear for engaging a rack attached to the directing tray, the gear using the rotational movement of the motor to move the directing tray in the first direction.

5. The apparatus of claim 4, wherein the directing tray comprises a pair of flanges that flank the gear and rack for preventing lateral displacement between the gear and the rack.

6. The apparatus of claim 3, wherein the guide mechanism comprises two gears spaced axially apart for engaging two racks attached to the directing tray, the two gears using the rotational movement of the motor to move the directing tray in the first direction.

7. The apparatus of claim 1, further comprising at least one other cassette including another recess corresponding to variable dimensions of another food item in order to receive the another food item therein.

8. The apparatus of claim 7, wherein a depth of the recess of the at least one cassette is determined based upon a thickness of the food item, such that a top surface of the food item is positioned an optimal distance from the printing device when the directing tray receiving the at least one cassette and the at least one other cassette is positioned below the printing device, and wherein a depth of the another recess of the at least one other cassette is determined based upon a thickness of the another food item, such that a top surface of the another food item is positioned the optimal distance from the printing device when the directing tray receiving the at least one cassette and the at least one other cassette is positioned below the printing device.

9. The apparatus of claim 1, wherein the printing device prints the image onto the food item using edible ink or edible food dye.

10. A method for printing an image onto a food item using a printing apparatus including a directing tray, a guide mechanism, and a printing device, the method comprising:
selecting dimensions of the food item;
designing a cassette for supporting the food item including a recess corresponding to the dimensions of the food item in order to receive the food item therein;
receiving, by the cassette, the food item;
receiving, by the directing tray, the cassette, the directing tray being capable of receiving a plurality of cassettes;
receiving, by the guide mechanism, the directing tray;
guiding, by the guide mechanism, the directing tray in a first direction while maintaining a planar height of the directing tray; and
printing, by the printing device, the image onto the food item as the directing tray passes under the printing device in the first direction, the printing device being moveable only within a plane at a fixed height above the directing tray,
wherein designing the cassette for supporting the food item comprises determining a depth of the recess of the cassette based upon a thickness of the food item, such that a top surface of the food item is positioned a predetermined optimal distance from the printing device when the directing tray receiving is positioned below the printing device.

11. The method of claim 10, further comprising:
receiving an image in a computer; and
controlling the printing device such that the received image is printed onto the food item.

12. The method of claim 10, further comprising:
selecting dimensions of another food item;
designing another cassette for supporting the another food item including a recess corresponding to the dimensions of the another food item in order to receive the another food item therein;
receiving, by the another cassette, the another food item; and
receiving, by the directing tray, the another cassette,
wherein designing the another cassette for supporting the another food item comprises determining a depth of the recess of the another cassette based upon a thickness of the another food item, such that a top surface of the another food item is positioned the optimal distance from the printing device when the directing tray receiving the another cassette is positioned below the printing device.

13. The method of claim 10, further comprising:
selecting dimensions of another food item;
designing another cassette for supporting the another food item including a recess corresponding to the dimensions of the another food item in order to receive the another food item therein;
receiving, by the another cassette, the another food item; and
receiving, by the directing tray, the another cassette.

14. The method of claim 10, wherein printing, by the printing device, the image onto the food item comprises moving the printing device in a second direction and a third direction within the plane, the second and the third directions being perpendicular to the first direction, in order to linearly apply the image to onto the food item as the directing tray is moved in the first direction below the printing device.

15. The method of claim 10, wherein the image is printed onto the food item using edible ink or edible food dye.

16. The apparatus of claim 4, wherein the rack is attached to a bottom surface of the directing tray.

* * * * *